(12) United States Patent
Lipkin

(10) Patent No.: US 8,280,814 B2
(45) Date of Patent: Oct. 2, 2012

(54) REVERSE VAULT CASH SYSTEM AND METHODS

(75) Inventor: David Israel Lipkin, Studio City, CA (US)

(73) Assignee: Verifone Israel Ltd., Rosh Ha'Ayin (IL)

( * ) Notice: Subject to any disclaimer, the term of this patent is extended or adjusted under 35 U.S.C. 154(b) by 1685 days.

(21) Appl. No.: 10/558,571

(22) PCT Filed: Jan. 3, 2005

(86) PCT No.: PCT/IL2005/000007
§ 371 (c)(1),
(2), (4) Date: Nov. 29, 2005

(87) PCT Pub. No.: WO2005/065043
PCT Pub. Date: Jul. 21, 2005

(65) Prior Publication Data
US 2007/0027800 A1    Feb. 1, 2007

Related U.S. Application Data

(60) Provisional application No. 60/534,709, filed on Jan. 8, 2004.

(51) Int. Cl.
*G06Q 40/00*    (2012.01)
(52) U.S. Cl. .......................................... 705/43; 705/35
(58) Field of Classification Search .................... 705/35, 705/43
See application file for complete search history.

(56) References Cited

U.S. PATENT DOCUMENTS

| 4,412,292 | A | 10/1983 | Sedam et al. | |
|---|---|---|---|---|
| 5,724,523 | A * | 3/1998 | Longfield | 705/35 |
| 5,844,808 | A | 12/1998 | Konsmo et al. | |
| 5,963,452 | A | 10/1999 | Etoh et al. | |
| 6,081,791 | A * | 6/2000 | Clark | 705/43 |
| 6,158,657 | A * | 12/2000 | Hall et al. | 235/379 |
| 6,443,359 | B1 * | 9/2002 | Green et al. | 235/379 |
| 6,481,620 | B1 * | 11/2002 | Katou et al. | 235/379 |
| 6,659,340 | B2 * | 12/2003 | Siemens | 235/379 |
| 6,766,306 | B1 | 7/2004 | Matsuyama | |
| 2002/0082994 | A1 * | 6/2002 | Herziger | 705/43 |
| 2004/0030648 | A1 * | 2/2004 | Chirnomas | 705/43 |

FOREIGN PATENT DOCUMENTS

JP    07-334725    12/1995
(Continued)

OTHER PUBLICATIONS http://www.atmmarketplace.com/news_printable.htm?id=16865.*
(Continued)

*Primary Examiner* — Hani M Kazimi
*Assistant Examiner* — John Scarito
(74) *Attorney, Agent, or Firm* — Ladas & Parry LLP

(57) ABSTRACT

An electronic cash management system including a plurality of electronic cash safes each associated with a cash acceptor and a communicator under the physical control of a financial institution operating as a vault cash manager which owns the cash located therein and operative upon receipt of cash into one of said plurality of cash safes, verified by the cash acceptor to employ the communicator for providing a computer network notification to the financial institution indicating receipt of the cash as vault cash owned by the financial institution.

22 Claims, 2 Drawing Sheets

FOREIGN PATENT DOCUMENTS

| JP | 2001-306962 | 11/2001 |
|---|---|---|
| WO | WO 02/19281 | 3/2002 |
| WO | WO 03/107232 | 12/2003 |

OTHER PUBLICATIONS

Breitkopf, David, American Banker, vol. 168, No. 182, Sep. 22, 2003.*

All, Ann, "Cash Control:Management Options Can Help Cut Costs", ATMmarketplace.com, 2003.*

U.S. Appl. No. 60/534,709, filed Jan. 8, 2004, entitled: "Reverse Vault Cash System and Methods".

http://www.technikmfg.com/PHONECARDS.HTM.

David Breitkopf, American Banker, vol. 168, No. 182, Sep. 22, 2003.

http://www.armoreduniverse.com/news.asp?id=234.

An Office Action dated May 18, 2010, which issued during the prosecution of Applicant's Japanese Patent Application No. 2006-548576.

A Supplementary European Search Report dated Mar. 3, 2011, which issued during the prosecution of Applicant's European Patent Application No. 05703050.

\* cited by examiner

REVERSE VAULT CASH SYSTEM AND METHODS

REFERENCE TO RELATED APPLICATIONS

Reference is made to U.S. Provisional Patent Application Ser. No. 60/534,709, filed Jan. 8, 2004 and entitled REVERSE VAULT CASH SYSTEM AND METHODS, the disclosure of which is hereby incorporated by reference and priority of which is hereby claimed under 37 C.F.R. 1.78(4).

FIELD OF THE INVENTION

The present invention relates to computerized cash management generally.

BACKGROUND OF THE INVENTION

The following U.S. Patent documents are believed to represent the current state of the art: U.S. Pat. No. 6,766,306.

SUMMARY OF THE INVENTION

The present invention seeks to provide improved systems and methodologies for cash management.

There is thus provided in accordance with a preferred embodiment of the present invention an electronic cash management methodology including providing a plurality of electronic cash safes each associated with a communicator, upon receipt of cash into one of the plurality of cash safes, employing the communicator for providing a computer network notification from the one of the plurality of electronic cash safes indicating receipt of the cash and at least partially identifying a product sold in return for the cash, responsive to at least one of the computer network notification from the communicator, effecting payment to a supplier of the product by a financial institution having physical control of the cash safe, accruing non-loan interest payable from an operator of the one of the plurality of electronic cash safes to the financial institution in respect of the payment as from the time of the effecting payment, collecting the cash from the cash safe on behalf of the financial institution and depositing the cash to the account of the financial institution, terminating the accruing non-loan interest upon the depositing the cash to the extent that the cash covers the payment and payment by the operator of the one of the plurality of electronic cash safes of accrued non-loan interest in respect of the payment to the financial institution having control of the cash safe.

In accordance with a preferred embodiment of the present invention the providing a plurality of electronic cash safes each associated with a communicator includes providing at least one of electronic vending machines and electronic kiosks.

In accordance with another preferred embodiment of the present invention the providing a plurality of electronic cash safes each associated with a communicator includes providing data communications functionality for data communication to and from a computerized point of sale.

In accordance with yet another preferred embodiment of the present invention the computer network notification is communicated via a computerized point of sale operator's computer to at least one of the supplier and the financial institution. Preferably, the financial institution is a vault cash manager.

In accordance with still another preferred embodiment of the present invention the payment by the operator of the one of the plurality of electronic cash safes of accrued non-loan interest in respect of the payment by the financial institution having control of the cash safe is effected by remitting by the financial institution to the operator of the proceeds of the cash collected from the cash safe and deposited to the account of the financial institution less at least payments by the financial institution to the supplier and less accrued non-loan interest due to the financial institution. Preferably, the electronic cash management system also includes providing ATM functionality. Typically, the providing ATM functionality employs at least some of the cash received into one of the plurality of cash safes.

In accordance with a further preferred embodiment of the present invention the product includes at least one of a pre-paid telephone calling card, train ticket, stored value card, bill paying services, stored value card topping-up services and printable tickets.

In accordance with a still further preferred embodiment of the present invention at least one of the:

responsive to at least one of the computer network notification from the communicator, effecting payment to a supplier of the product by a financial institution having physical control of the cash safe;

accruing non-loan interest payable from an operator of the one of the plurality of electronic vending machines to the financial institution in respect of the payment as from the time of the effecting payment;

terminating the accruing non-loan interest upon the depositing the cash to the extent that the cash covers the payment; and payment by the operator of the one of the plurality of electronic vending machines of accrued non-loan interest in respect of the payment to the financial institution having control of the cash safe, employs a vault cash manager server.

There is also provided in accordance with another preferred embodiment of the present invention an electronic vending machine methodology including providing a plurality of electronic vending machines, each having a cash safe and a communicator, upon receipt of cash into the cash safe at one of the plurality of electronic vending machines employing the communicator for providing a computer network notification from the one of the plurality of electronic vending machines indicating receipt of the cash and at least partially identifying a product sold in return for the cash, responsive to at least one of the computer network notification from the communicator, effecting payment to a supplier of the product by a financial institution having physical control of the cash safe, accruing non-loan interest payable from an operator of the one of the plurality of electronic vending machines to the financial institution in respect of the payment as from the time of the effecting payment, collecting the cash from the cash safe of the one of the plurality of electronic vending machines on behalf of the financial institution and depositing the cash to the account of the financial institution, terminating the accruing non-loan interest upon the depositing the cash to the extent that the cash covers the payment, and payment by the operator of the one of the plurality of electronic vending machines of accrued non-loan interest in respect of the payment to the financial institution having control of the cash safe.

In accordance with a preferred embodiment of the present invention the providing a plurality of electronic vending machines includes providing at least one electronic vending machine having a locked cash vault which is not under the control of the operator.

In accordance with another preferred embodiment of the present invention the providing a plurality of electronic cash safes includes providing data communications functionality for data communication to and from a computerized point of sale.

In accordance with yet another preferred embodiment of the present invention at least one of the:

responsive to at least one of the computer network notification from the communicator, effecting payment to a supplier of the product by a financial institution having physical control of the cash safe;

accruing non-loan interest payable from an operator of the one of the plurality of electronic vending machines to the financial institution in respect of the payment as from the time of the effecting payment;

terminating the accruing non-loan interest upon the depositing the cash to the extent that the cash covers the payment; and payment by the operator of the one of the plurality of electronic vending machines of accrued non-loan interest in respect of the payment to the financial institution having control of the cash safe, employs a vault cash manager server.

There is also provided in accordance with yet another preferred embodiment of the present invention an electronic cash management system including a plurality of computerized points of sale including electronic cash safes each associated with a communicator, the communicator being operative, upon receipt of cash into one of the plurality of cash safes, employing the communicator for providing a computer network notification from the one of the plurality of electronic cash safes indicating receipt of the cash and at least partially identifying a product sold in return for the cash, a vault cash server, responsive to at least one of the computer network notification from the communicator, for effecting payment to a supplier of the product by a financial institution having physical control of the cash safe, non-loan interest accrual functionality accruing non-loan interest payable from an operator of the one of the plurality of electronic cash safes to the financial institution in respect of the payment to the supplier as from the time of the effecting payment and terminating the accruing non-loan interest upon collecting the cash from the cash safe on behalf of the financial institution and depositing the cash to the account of the financial institution to the extent that the cash covers the payment and non-loan interest payment functionality paying the non-loan interest by the operator of the one of the plurality of electronic cash safes of the accrued non-loan interest to the financial institution having control of the cash safe.

In accordance with a preferred embodiment of the present invention the plurality of computerized points of sale include at least one of electronic vending machines and electronic kiosks.

In accordance with another preferred embodiment of the present invention the plurality of electronic cash safes each associated with a communicator include data communications functionality for data communication to and from at least one of the plurality of computerized points of sale.

In accordance with still another preferred embodiment of the present invention the electronic cash management system also includes providing ATM functionality. Preferably, the ATM functionality employs a bill recycler for utilizing at least some of the cash received into one of the plurality of cash safes.

There is additionally provided in accordance with still another preferred embodiment of the present invention an electronic cash management methodology including providing a plurality of electronic cash safes each associated with a communicator, upon receipt of cash into one of the plurality of cash safes, employing the communicator for providing a computer network notification from the one of the plurality of electronic cash safes indicating receipt of the cash and at least partially identifying a product sold in return for the cash, responsive to at least one of the computer network notification from the communicator, effecting payment to a supplier of the product by a financial institution having physical control of the cash safe, establishing a non-loan payment obligation payable from an operator of the one of the plurality of electronic cash safes to the financial institution in respect of the payment upon the effecting payment, collecting the cash from the cash safe on behalf of the financial institution and depositing the cash to the account of the financial institution and payment by the operator of the one of the plurality of electronic cash safes of the non-loan payment to the financial institution having control of the cash safe.

In accordance with a preferred embodiment of the present invention at least one of the:

responsive to at least one of the computer network notification from the communicator, effecting payment to a supplier of the product by a financial institution having physical control of the cash safe;

establishing a non-loan payment obligation payable from an operator of the one of the plurality of electronic cash safes to the financial institution in respect of the payment upon the effecting payment;

collecting the cash from the cash safe on behalf of the financial institution and depositing the cash to the account of the financial institution; and payment by the operator of the one of the plurality of electronic cash safes of the non-loan payment to the financial institution having control of the cash safe employs a vault cash manager server.

There is also provided in accordance with a still further preferred embodiment of the present invention an electronic vending machine methodology including providing a plurality of electronic vending machines, each having a cash safe and a communicator, upon receipt of cash into the cash safe at one of the plurality of electronic vending machines employing the communicator for providing a computer network notification from the one of the plurality of electronic vending machines indicating receipt of the cash and at least partially identifying a product sold in return for the cash, responsive to at least one of the computer network notification from the communicator, effecting payment to a supplier of the product by a financial institution having physical control of the cash safe, establishing a non-loan payment obligation payable from an operator of the one of the plurality of electronic vending machines to the financial institution in respect of the payment upon the effecting payment, collecting the cash from the cash safe of the one of the plurality of electronic vending machines on behalf of the financial institution and depositing the cash to the account of the financial institution, and payment by the operator of the one of the plurality of electronic cash safes of the non-loan payment to the financial institution having control of the cash safe.

In accordance with a preferred embodiment of the present invention at least one of the:

responsive to at least one of the computer network notification from the communicator, effecting payment to a supplier of the product by a financial institution having physical control of the cash safe;

establishing a non-loan payment obligation payable from an operator of the one of the plurality of electronic vending machines to the financial institution in respect of the payment upon the effecting payment;

collecting the cash from the cash safe of the one of the plurality of electronic vending machines on behalf of the financial institution and depositing the cash to the account of the financial institution; and payment by the operator of the one of the plurality of electronic cash safes of the non-loan payment to the financial institution having control of the cash safe, employs a vault cash manager server.

There is further provided in accordance with a yet further preferred embodiment of the present invention an electronic cash management system including a plurality of computerized points of sale including electronic cash safes each associated with a communicator, the communicator being operative, upon receipt of cash into one of the plurality of cash safes, employing the communicator for providing a computer network notification from the one of the plurality of electronic cash safes indicating receipt of the cash and at least partially identifying a product sold in return for the cash, a vault cash server, responsive to at least one of the computer network notification from the communicator, for effecting payment to a supplier of the product by a financial institution having physical control of the cash safe and non-loan payment functionality paying a non-loan payment by the operator of the one of the plurality of electronic cash safes to the financial institution having control of the cash safe.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
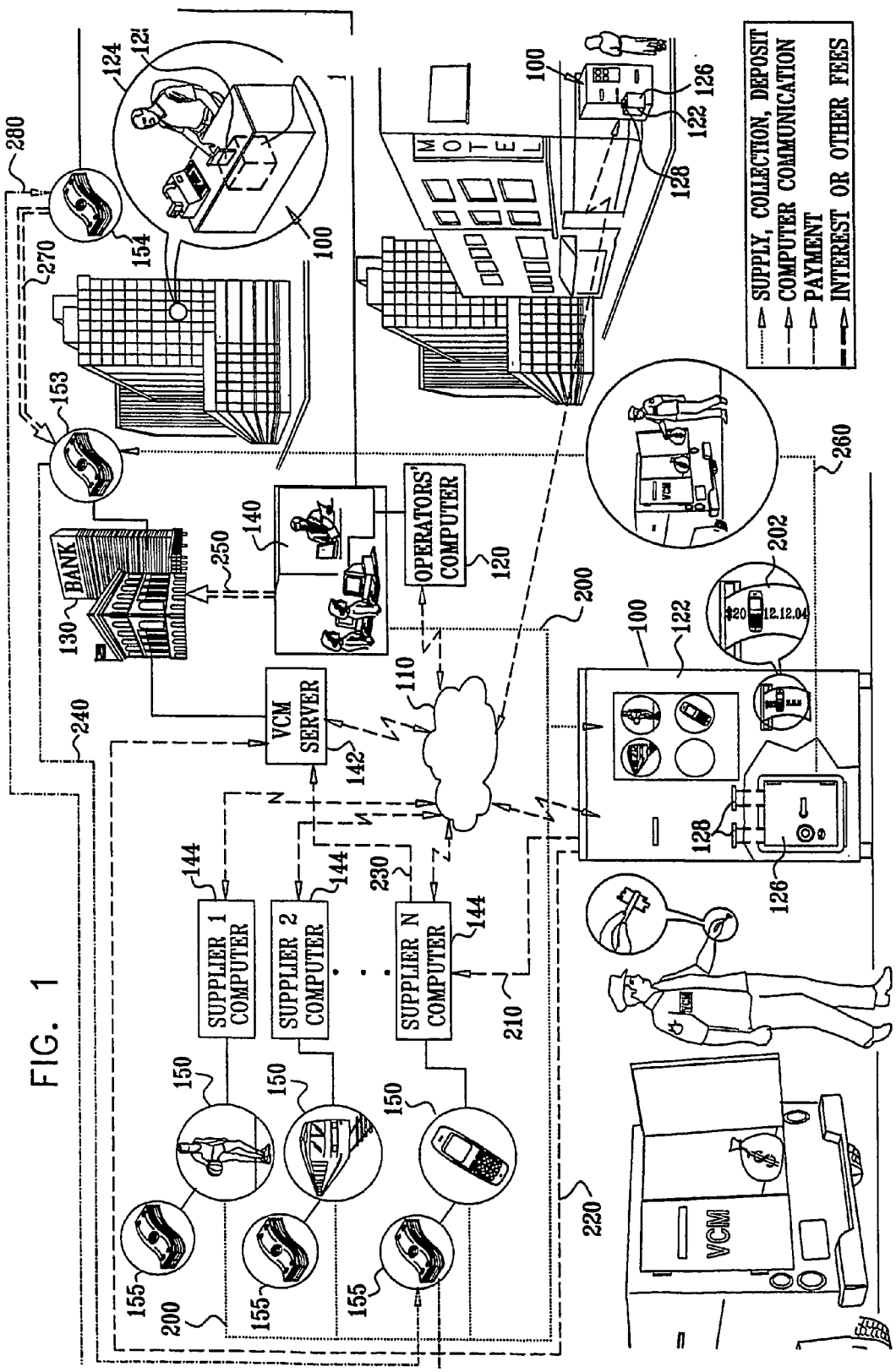
FIG. 1 is a simplified pictorial block diagram illustration of a cash management system constructed and operative in accordance with a preferred embodiment of the present invention.

Reference is now made to FIG. 1, which is a simplified pictorial block diagram illustration of a cash management system constructed and operative in accordance with a preferred embodiment of the present invention. As seen in FIG. 1, a plurality of computerized points of sale, each generally designated by reference numeral 100 communicate using a modem via a computer network or other data communication functionality 110, such as the Internet, with a computerized point of sale operator's computer 120. The computerized points of sale may be unmanned, such as computerized vending machines 122, such as the Lipman NURIT® Model 6000, commercially available from Lipman Electronic Engineering Ltd. of Rosh Ha'ayin, Israel, the VCOM, commercially available from NCR Corporation, and the Personas 90, also commercially available from NCR Corporation, or manned, such as a teller operated cash transaction installation 124 into which an teller inserts cash 125. The computerized points of sale, whether manned or unmanned, are also characterized in that they include a cash vault 126, preferably associated with a cash acceptor, 128, which is not under the physical control of the operator thereof or of the entity at whose location the computerized point of sale is placed. The cash vault may also be provided with bill recycle functionality, such as that described in U.S. Pat. No. 6,481,620, the disclosure of which is hereby incorporated by reference.

In accordance with a preferred embodiment of the invention, the cash vault 126 is under the physical control of a vault cash manager 130, which owns the cash located therein and which, through its agents, such as armored car messengers, has physical access to the vault for placing cash therein and removing cash therefrom. Typically access to the cash vault 126 is controlled by an electronic lock and/or a mechanical lock, although any other suitable access control mechanism may be employed. The vault cash manager is an entity separate from the operator of the computerized points of sale, which is designated by reference numeral 140. The vault cash manager 130 preferably operates a server 142, here termed a VCM server. The VCM server 142 may communicate via email or any other suitable data communication methodology.

One or more computerized point of sale operator's computers 120, each communicating with a plurality of computerized points of sale 100, communicates with VCM server 142. Typically the computerized point of sale operator's computer 120 is controlled by the operator 140 of the computerized points of sale with which it communicates, which is a separate entity from the vault cash manager 130.

The computerized point of sale operator's computer 120 also typically communicates with a plurality of suppliers' computers, each designated by reference numeral 144. Each supplier, here designated by reference numeral 150, typically is responsible for one or more products sold at one or more computerized points of sale 100. For example, the products may include, pre-paid telephone calling cards, train tickets, stored value cards, such as debit cards as well as printable ticket blanks for events, such as a sporting event and blanks for other types of products or services. The products may also include various services, such as bill payment services and stored value card topping up services, which may be handled in a similar manner as that for conventional products as described herein. The suppliers' computers also typically communicate with the VCM server 142, but typically not in real time.

The operator's computer 120 typically includes a modem and preferably also at least one of an email generator and a fax generator, for sending reports and other communications to the VCM server 142, the suppliers' computers 144 and the computerized points of sale 100.

Alternatively, computerized point of sale operator's computers 120 may be eliminated, and the individual computerized points of sale 100 may communicate directly with the VCM server 142 and with the suppliers' computers 144.

Normally, the vault cash manager 130, the computerized point of sale operator 140 and the suppliers 150 each maintain a bank account which is accessible by computer communication for funds transfer. The bank account of the vault cash manager, here termed the VCM bank account, is designated by reference numeral 153; the bank account of the computerized point of sale operator 140 is designated by reference numeral 154 and the bank accounts of the suppliers 150 are each designated by reference numeral 155.

Figure 2:
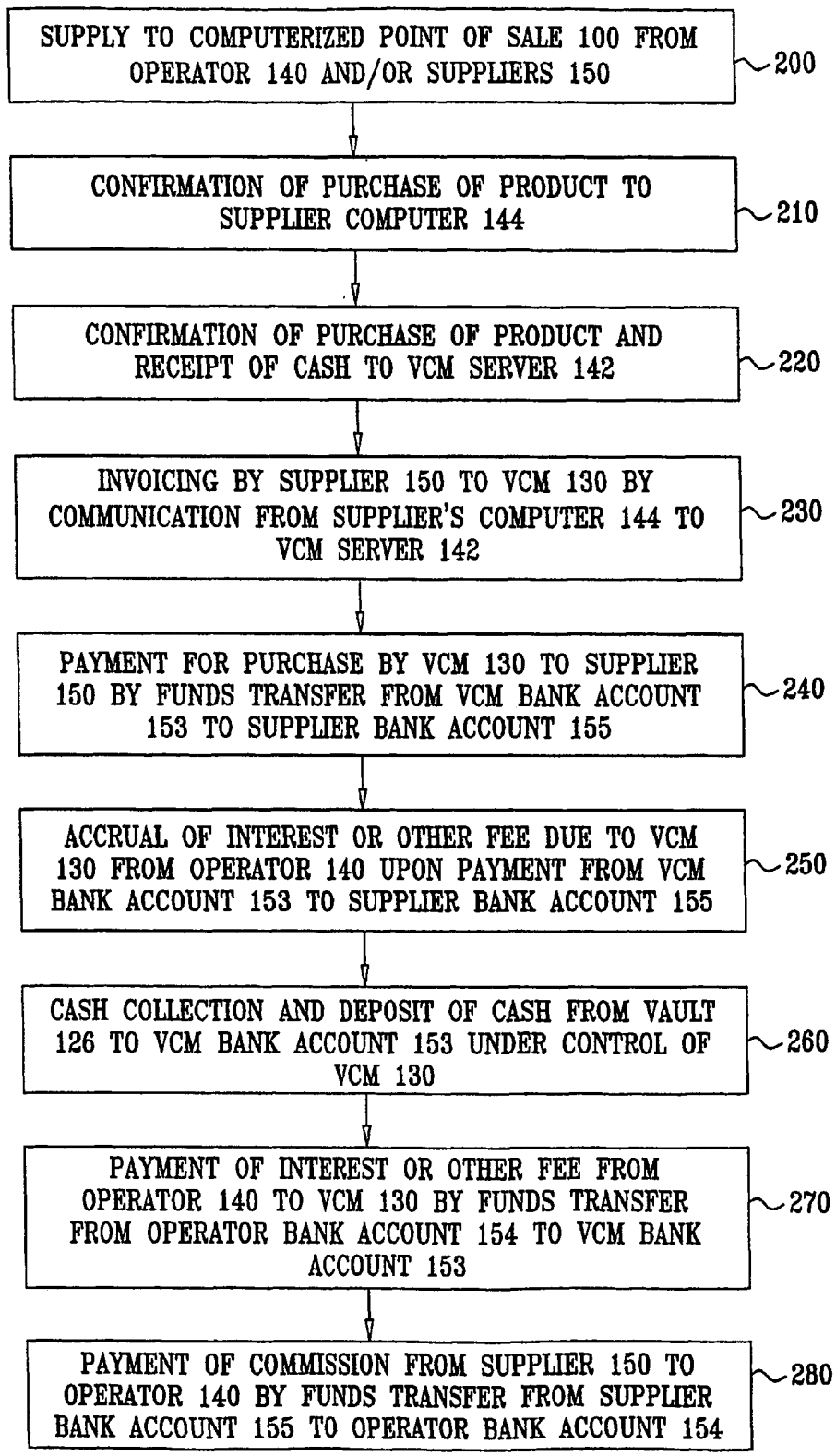
FIG. 2 is a simplified block diagram illustration of operation of the cash management system of FIG. 1 in accordance with a preferred embodiment of the present invention.

Reference is now made additionally to FIG. 2, which is a simplified flow chart illustrating preferred operation of the system of FIG. 1. Prior to operation of each computerized point of sale 100, the operator 140 and/or one or more suppliers 150 supply products to the computerized point of sale 100. The operator 140 may also provide a stock of cash to the vault 126, particularly when ATM functionality is provided by a computerized point of sale 100. This supply operation is designated by reference numeral 200 in FIGS. 1 and 2. The supply of cash may be provided alternatively via the VCM 130.

When a customer purchases a product, such as a prepaid telephone card 202, he or a teller typically inserts cash 125 into a cash acceptor 128 associated with a vault 126 at the computerized point of sale 100. Upon automated computerized verification of cash entry into vault 126, which verification is preferably effected by a conventional cash validator/acceptor and is preferably not under the control of operator 140, the computerized point of sale 100 typically communicates, preferably via operator computer 120, with the VCM server 142 and with the relevant suppliers' computer 144. One communication confirms purchase of the product to the supplier computer 144, as designated by reference numeral 210. Another communication confirms the purchase and the receipt of the cash to the VCM server, as designated by reference numeral 220. Communication with the VCM server 142 is typically not in real time.

The supplier computer 144 invoices the VCM electronically via the VCM server 142, as designated by reference numeral 230. Typically, this invoicing is carried out as a batch process, once per day. Typically, the invoice amount is the full price of the product as collected by the computerized point of sale. Alternatively, the invoice amount is the wholesale sales price of the product from the supplier 150 to the operator 140, which is typically a percentage of the total sales price of the product to the consumer.

Upon receipt of the invoice from the supplier, the VCM server 142 correlates the invoice with the confirmation of purchase received in operation 220.

Upon successful completion of the correlation, the VCM 130 transfers payment for the purchase from the bank account 153 of the VCM 130 to the bank account 155 of the relevant supplier 150, via an electronic transfer initiated by VCM server 142, as designated by reference numeral 240. Typically, the payments are carried out in a batch process, once per day.

It is a particular feature of the present invention, that upon funds transfer from the bank account 153 of the VCM 130 to the bank account 155 of the supplier 150, interest or another fee payable by the operator 140 to the VCM 130 is accrued. Furthermore, this interest or other fee is lower than that of an ordinary loan, since the cash in vault 126 is under the physical control of the VCM 130. This interest or fee accrual is designated by reference numeral 250, it being understood that the fee may be a time based fee or a flat fee. Interest continues to accrue until the cash in the vault 126 is physically collected from vault 126 and actually deposited in the bank account 153 of the VCM 130. The cash collection and deposit operation is designated by reference numeral 260 and takes place with timing controlled by the operator 140, taking into account the cost of collection on one hand and the amount of interest or time based fee accruing on the other hand.

Upon deposit of the cash into the bank account 153 of the VCM 130, the VCM receives a payment of interest or another fee from the operator 140, as designated by reference numeral 270. Typically, the payments are made in a batch process, once per month by funds transfer from the bank account 154 of the operator 140 to the bank account 153 of the VCM 130. Sales commissions are paid by the suppliers 150 to the operator 140 in respect of sales by the computerized points of sale 100, as designated by reference numeral 280. Typically, the commission payments are made in a batch process, once per month by funds transfer from the bank accounts 155 of the suppliers 150 to the bank account 154 of the operator 140. Alternatively, where the invoice amounts are the wholesale prices of the products to the operator 140, the VCM 130 transfers to the bank account 154 of the operator 140, the net proceeds of the sales, after payment of the suppliers 150 and interest, fees and other charges to the VCM 130.

It will be appreciated by persons skilled in the art that the present invention is not limited by the claims which follow but includes combinations and subcombinations of the various features described hereinabove as well as modifications and variations thereof which would occur to persons reading the foregoing description and which are not in the prior art.

The invention claimed is:

1. An electronic cash management methodology comprising:
    providing a plurality of electronic cash safes under the physical control of a financial institution, operating as a vault cash manager which owns cash located therein, each of said plurality of electronic cash safes being associated with a cash acceptor and a communicator;
    upon receipt of cash into one of said plurality of electronic cash safes, verified by said cash acceptor, employing said communicator for providing a computer network notification from said one of said plurality of electronic cash safes indicating receipt of said cash and at least partially identifying a product sold in return for the cash;
    responsive to said computer network notification from said communicator, effecting payment to a supplier of said product by said financial institution;
    accruing non-loan interest payable from an operator of said one of said plurality of electronic cash safes to said financial institution in respect of said payment;
    collecting said cash from said one of said plurality of electronic cash safes on behalf of said financial institution and physically depositing said cash to the account of said financial institution; and
    paying to said financial institution by said operator of said one of said plurality of electronic cash safes of said non-loan interest accrued in respect of said payment to said supplier for a period between said effecting payment to said supplier and said depositing said cash.

2. The electronic cash management methodology according to claim 1, wherein said providing a plurality of electronic cash safes comprises providing at least one of electronic vending machines and electronic kiosks.

3. The electronic cash management methodology according to claim 1, wherein said providing a plurality of electronic cash safes comprises providing data communications functionality for data communication to and from a computerized point of sale.

4. The electronic cash management methodology according to claim 1, wherein said computer network notification is communicated via a computerized point of sale operator's computer to at least one of said supplier and said financial institution.

5. The electronic cash management methodology according to claim 1, wherein said paying to said financial institution by said operator of said one of said plurality of electronic cash safes of said non-loan interest accrued in respect of said payment to said supplier is effected by remitting by said financial institution to said operator net proceeds of said cash collected from said at least one of said plurality of electronic cash safes and deposited to the account of said financial institution less said payment to said supplier and less said non-loan interest accrued in respect of said payment to said supplier due to said financial institution.

6. The electronic cash management methodology according to claim 1, wherein said methodology further comprises providing ATM functionality.

7. The electronic cash management methodology according to claim 6, wherein said providing ATM functionality employs at least some of said cash received into said one of said plurality of electronic cash safes.

8. The electronic cash management methodology according to claim 1, wherein said product comprises at least one of a pre-paid telephone calling card, train ticket, stored value card, bill paying services, stored value card topping-up services and printable tickets.

9. The electronic cash management methodology according to claim 1, wherein at least one of said effecting step, said accruing step and said payment step employs a vault cash manager server.

10. An electronic vending machine methodology comprising:
   providing a plurality of electronic vending machines, each having a cash safe, under the physical control of a financial institution operating as a vault cash manager which owns the cash located therein, a cash acceptor, and a communicator;
   upon receipt of cash into said cash safe at one of said plurality of electronic vending machines as verified by said cash acceptor, employing said communicator for providing a computer network notification from said one of said plurality of electronic vending machines indicating receipt of said cash and at least partially identifying a product sold in return for the cash;
   responsive to said computer network notification from said communicator, effecting payment to a supplier of said product by said financial institution;
   accruing non-loan interest payable from an operator of said one of said plurality of electronic vending machines to said financial institution in respect of said payment;
   collecting said cash from said cash safe of said one of said plurality of electronic vending machines on behalf of said financial institution and physically depositing said cash to the account of said financial institution; and
   paying to said financial institution by said operator of said one of said plurality of electronic vending machines of said non-loan interest accrued in respect of said payment to said supplier for a period between said effecting payment to said supplier and said depositing said cash.

11. The electronic vending machine methodology according to claim 10, wherein said providing a plurality of electronic vending machines comprises providing at least one electronic vending machine having a locked cash vault which is not under the control of said operator.

12. The electronic vending machine methodology according to claim 10, wherein said providing a plurality of electronic vending machines comprises providing data communications functionality for data communication to and from a computerized point of sale.

13. The electronic vending machine methodology according to claim 10, wherein said computer network notification is communicated via a computerized point of sale operator's computer to at least one of said supplier and said financial institution.

14. The electronic vending machine methodology according to claim 10, wherein said paying to said financial institution by said operator of said one of said plurality of electronic vending machines of said non-loan interest accrued in respect of said payment to said supplier is effected by remitting by said financial institution to said operator net proceeds of said cash collected from said cash safe and deposited to the account of said financial institution less said payment to said supplier and less said non-loan interest accrued in respect of said payment to said supplier due to said financial institution.

15. The electronic vending machine methodology according to claim 10, wherein said methodology further comprises providing ATM functionality.

16. The electronic vending machine methodology according to claim 15, wherein said providing ATM functionality employs at least some of said cash received into said cash safe of said one of said plurality of electronic vending machines.

17. The electronic vending machine methodology according to claim 10, wherein said product comprises at least one of a pre-paid telephone calling card, train ticket, stored value card, bill paying services, stored value card topping-up services and printable tickets.

18. The electronic vending machine methodology according to claim 10, wherein at least one of said effecting step, said accruing step and said payment step employs a vault cash manager server.

19. An electronic cash management system comprising:
   a plurality of computerized points of sale including electronic cash safes under the physical control of a financial institution operating as a vault cash manager which owns the cash located therein, each associated with a cash acceptor, and a communicator, said communicator being operative, upon receipt of cash into one of said electronic cash safes, employing said communicator for providing a computer network notification from said one of said electronic cash safes indicating receipt of said cash and at least partially identifying a product sold in return for the cash; and
   a vault cash server, responsive to said computer network notification from said communicator, for effecting payment to a supplier of said product by said financial institution.

20. The electronic cash management system according to claim 19, wherein said plurality of computerized points of sale include at least one of electronic vending machines, ATMs and electronic kiosks.

21. The electronic cash management system according to claim 20, wherein said system further comprises ATM functionality employing a bill recycler for utilizing at least some of said cash received into one of said electronic cash safes.

22. The electronic cash management system according to claim 19, wherein said product comprises at least one of a pre-paid telephone calling card, train ticket, stored value card, bill paying services, stored value card topping-up services and printable tickets.

* * * * *